Patented Feb. 19, 1952

UNITED STATES PATENT OFFICE 2,586,139

PRODUCTION OF ACETALS

Robert L. Adelman, Niagara Falls, N. Y., assignor to E. I. du Pont de Nemours & Company, Wilmington, Del., a corporation of Delaware No Drawing. Application January 20, 1950, Serial No. 139,791

2 Claims. (Cl. 260—488)

This invention relates to the production of acetals and more particularly to a novel method for producing carboxyl-substituted acetals.

Acetals may be produced by reacting acetaldehyde with alcohols, e. g.:

$$CH_3CHO + 2C_2H_5OH \rightarrow CH_3CH(OC_2H_5OH)_2 + H_2O$$

It has been shown (Croxall et al., U. S. P. 2,446,171) that vinyl esters may be used in place of acetaldehyde, thus:

$$CH_3COOCH=CH_2 + 2C_2H_5OH \rightarrow$$
$$CH_3CH(OC_2H_5)_2 + CH_3COOH$$

The work of Mowry et al. (J. A. C. S. 69, 2358 (1947)) shows that all aliphatic hydroxy compounds will not react with vinyl esters like the simple alcohols to form acetals, as these authors found that certain hydroxy carboxylic acids react with vinyl esters to form the heterocyclic compounds, dioxolanes, e. g.,

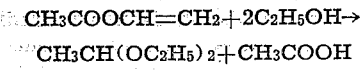

As a catalyst for the above reaction, Mowry et al. used mercuric sulfate with the addition of sulfuric acid. Now Toussant et al., U. S. P. 2,299,862 and Herrmann et al. U. S. P. 2,245,131 show that in the presence of mercuric sulfate vinyl esters react with carboxylic acids to form the vinyl esters of the acid reactants, thus:

$$CH_3COOCH=CH_2 + RCOOH \rightarrow$$
$$RCOOCH=CH_2 + CH_3COOH$$

Hence, from the above it would be expected that the reaction of a vinyl ester with a hydroxy acid in the presence of a mercuric salt catalyst would form either a dioxolane or the vinyl ester of the hydroxy acid.

An object of the present invention is to prepare acetals of hydroxy acids, i. e., acetals having carboxy groups. A further object is to prepare carboxylated acetals by reacting hydroxy acids with vinyl esters. Another object is to produce certain novel acetals. Still other objects will be apparent from the following description.

I have discovered that certain hydroxy carboxylic acids can be reacted with vinyl esters to form carboxylated acetals. These hydroxy acids have the following type formula:

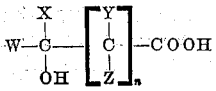

where W, X, Y, and Z represent hydrogen or organic radicals and $n$ is an integer. Examples of such hydroxy acids are:

Hydracrylic acid, $HOCH_2CH_2COOH$
Hydroxy trimethyl acetic acid, $$HOCH_2C(CH_3)_2COOH$$

Gamma-hydroxy-beta-methyl butyric acid, $$HOCH_2CH(CH_3)CH_2COOH$$

Beta-hydroxy-alpha,alpha-dimethyl butyric acid, $CH_3CH(OH)C(CH_3)_2COOH$
Epsilon-hydroxy caproic acid, $HO-(CH_2)_5COOH$ The reaction results in the formation of acetals and acetoxy acetals. Thus, by reacting hydracrylic acid with vinyl acetate the products of the reaction are (1) the acetal:

$$CH_3CH(OCH_2CH_2COOH)_2$$

and the acetoxy acetal:

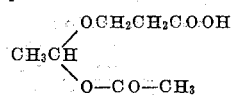

The invention is further illustrated by the following example:

Example

In a flask fitted with a stirrer and reflux condenser were added 59 g. (0.5 mole) hydroxy trimethyl acetic acid, 258 g. (3 moles) vinyl acetate, 0.01 g. copper resinate, 2 g. mercuric acetate, and 0.5 g. sulfuric acid in the above order. The temperature was 30° C. during the addition, but was raised to 45° C. to encourage solution of the hydroxy acid. The solution was then heated to 75° C. for 4 hours. 4 g. of sodium acetate were added to remove the catalyst and the clear solution distilled under reduced pressure.

After removal of vinyl acetate and 0.06 mole acetic acid, there was obtained as distillate fractions:

(a) 13 g., B. P. 113°–119°/5 mm. hydroxy trimethyl acetic acid (20% recovery).

(b) 41 g. slightly discolored, thick, residual liquid. This material partially crystallized; and by filtration and fractional crystallization of the mixture, there was obtained:

(1) 12 g.—acetal of hydroxy trimethyl acetic acid, M. P. 99°–100° C. (decomp.), neut. eq. 132, insol. in water, soluble in dilute alkali, decomposes in dilute acid with liberation of acetaldehyde.

(2) 29 g.—acetoxy acetal of hydroxy trimethyl acetic acid, very viscous liquid, neutral equiv.

203–205, saponification equivalent (after 2 hrs. at reflux in excess of 0.2 N alkali) 113. Decomposes in dilute aqueous alkali, acid, and neutral solutions, with acetaldehyde formation.

These products have the formulas:

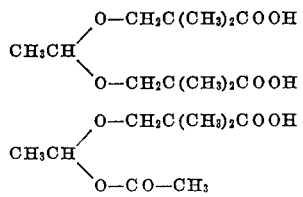

Acetoxy acetal of hydroxy trimethyl acetic acid

In practicing my invention, the catalyst used is a mercuric salt of a strong acid such as mercuric sulfate, mercuric phosphate, or a mercuric oxide-boron trifluoride complex. By "strong acid," I mean an acid whose acidic strength is at least as great as that of phosphoric acid. If mercuric sulfate is used, it is preferred to prepare the catalyst in situ (for example, from mercuric acetate plus sulfuric acid) as the catalyst so made dissolves more rapidly in the reaction medium and is considerably more reactive than the preformed catalyst. A ratio of 0.1%–10% by wt. of catalyst to alpha-hydroxy acid will give the desired reaction, but 1%–4% catalyst generally is preferred, to impart a suitably rapid reaction rate with a minimum of by-products.

Preferably, inhibitors such as hydroquinone or copper resinate are added in small conventional concentrations to prevent polymerization of the vinyl ester during the reaction.

The temperature of the reaction may be between 20° C. and the reflux temperature of the reaction medium (73–78° C., if vinyl acetate is used). The lower limit of temperature at which the reaction can be run is determined by the slowness of the reaction rate at low temperatures, and the solubility of the hydroxy acid in the vinyl ester medium. Thus, hydroxy trimethyl acetic acid dissolves very slowly in vinyl acetate below 30° C., but dissolves in a few minutes to give a homogeneous solution at 45°–55° C.

If desired, pressures above atmospheric may be used to increase the temperature of the reaction medium at reflux, e. g., up to 90° C., and so increase the reaction rate. However, the reaction proceeds readily at the atmospheric boiling point of most vinyl esters and usually a superatmospheric pressure is not necessary.

The velocity of the reaction may vary widely depending on the severity of reaction conditions, e. g., from 14–24 hrs. at 30° C. to 15 min.–1 hr. at 75° C., for hydroxy trimethyl acetic acid.

When the reaction has been effected, the catalyst is deactivated by the addition of a small amount of some alkali-reacting material, such as sodium acetate, sodium carbonate, or organic bases. The products are then separated by fractional crystallization, extraction, high vacuum distillation or other suitable method. The acetals and acetoxy acetals are, in general, easily separable by fractional crystallization.

Any vinyl ester may be employed, for example, vinyl esters of formic, acetic, chloroacetic, trimethyl acetic, propionic, butyric, benzoic, naphthoic, phthalic, lauric, and stearic acids. Generally, I prefer to utilize vinyl acetate or other low molecular weight vinyl esters, i. e., vinyl esters of acids containing from 1 to 4 carbon atoms.

While I may employ any hydroxy acid corresponding to the formula:

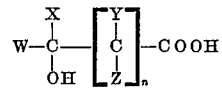

where W, X, Y, and Z are hydrogen or organic radicals and $n$ is an integer, such hydroxy acids of high molecular weight, which are not readily soluble in the vinyl ester tend to react slowly; and best results generally are obtained with hydroxy acids which readily dissolve in the vinyl ester. If desired, mutual solvents for the hydroxy acid and the vinyl ester may be added, for example, benzene, toluene, xylene and the like. Generally, I prefer to omit the solvent unless required to place the reactants in mutual solution. The most satisfactory results generally are obtained by employing a hydroxy acid of the above type formula when the radicals W, X, Y and Z are limited to hydrogen or alkyl radicals, $n$ is limited to integers from 1 to 10 and the total number of carbon atoms in the hydroxy acid molecule does not exceed about 16. The preferred hydroxy acids, which readily dissolve in vinyl acetate and readily react therewith at temperatures of 20 to 80° C. are those having the type formula:

$$R-CH_2-COOH$$

wherein R represents a hydroxyalkyl radical containing not more than 14 carbon atoms.

The products obtained according to my invention are dicarboxy acetals and acyloxy carboxy acetals which may be generically represented by the formulas:

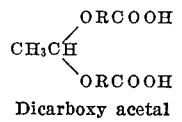

Dicarboxy acetal and:

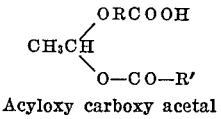

Acyloxy carboxy acetal where R is an organic radical comprising an aliphatic chain of at least 2 carbon atoms linking the ether oxygen atom to each COOH group and R' is the radical of the acid portion of the vinyl ester reacted (e. g., $CH_3$ when the vinyl ester is vinyl acetate). In accordance with the foregoing paragraph, radical R preferably will contain not more than 15 carbon atoms. These products may also be represented by the formulas:

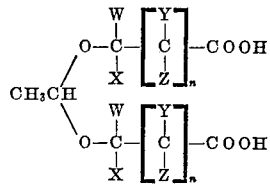

and:

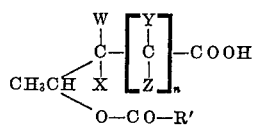

where R' has the meaning given above, W, X, Y and Z are hydrogen or organic radicals and $n$ is an integer. The preferred products will contain a total of not more than about 30 to 40 carbon atoms.

Products made from reacting vinyl acetate with saturated aliphatic hydroxy acids will have the formulas:

$$CH_3CH \begin{matrix} \nearrow ORCOOH \\ \searrow ORCOOH \end{matrix}$$

Acetal and:

$$CH_3CH \begin{matrix} \nearrow ORCOOH \\ \searrow O-CO-CH_3 \end{matrix}$$

Acetoxy acetal where R is a saturated aliphatic radical comprising a chain of at least two carbon atoms linking the ether oxygen to the COOH group.

These acetals and acyloxy acetals are useful as intermediates in chemical synthesis and particularly for the production of low molecular weight polyesters and polyamides.

I claim:
1. The acetyl acetal of hydroxy trimethylacetic acid having the formula:

$$CH_3-CH \begin{matrix} \nearrow O-CH_2-C(CH_3)_2COOH \\ \searrow O-CO-CH_3 \end{matrix}$$

2. The process which comprises reacting vinyl acetate with hydroxy trimethyl acetic acid in the presence of a mercuric salt of a strong organic acid at a temperature of from about 20° C. to the boiling point of said vinyl acetate, and recovering from the reaction mixture an acetal of said hydroxy trimethyl acetic acid.

ROBERT L. ADELMAN.

REFERENCES CITED

The following references are of record in the file of this patent:

UNITED STATES PATENTS

| Number | Name | Date |
|---|---|---|
| 2,364,455 | Loder et al. | Dec. 5, 1944 |